United States Patent
Hagan (10) Patent No.: US 7,755,515 B2
(45) Date of Patent: *Jul. 13, 2010

(54) APPARATUS AND METHOD FOR PREVENTING NIGHT BLINDNESS AND/OR VERTIGO AMONG PILOTS CAUSED BY THE REFLECTION OF AN AIRCRAFT'S ANTI-COLLISION WARNING LIGHTS FROM CLOUDS OR OTHER LIGHT REFLECTING CONDITIONS INTO THE COCKPIT

(76) Inventor: Riley Hagan, 119 Ockley Dr., Shreveport, LA (US) 71105

( * ) Notice: Subject to any disclaimer, the term of this patent is extended or adjusted under 35 U.S.C. 154(b) by 504 days.

This patent is subject to a terminal disclaimer.

(21) Appl. No.: 11/619,394

(22) Filed: Jan. 3, 2007

(65) Prior Publication Data

US 2008/0158012 A1    Jul. 3, 2008

(51) Int. Cl.
*G08G 5/04* (2006.01)
(52) U.S. Cl. ...................................... 340/961
(58) Field of Classification Search ................. 340/961, 340/945, 933, 438, 468; 362/470
See application file for complete search history.

(56) References Cited

U.S. PATENT DOCUMENTS

| | | | |
|---|---|---|---|
| 3,873,962 A | 3/1975 | Eggers et al. | |
| 4,346,430 A | 8/1982 | Holland | |
| 4,926,170 A * | 5/1990 | Beggs et al. | 340/904 |
| 5,057,820 A | 10/1991 | Markson et al. | |
| 5,422,716 A * | 6/1995 | Dempsey | 356/218 |
| 5,559,510 A | 9/1996 | Strong, III et al. | |
| 5,971,035 A * | 10/1999 | Griffioen | 138/155 |
| 6,252,702 B1 | 6/2001 | Cook et al. | |
| 6,456,205 B1 | 9/2002 | Russell et al. | |
| 6,940,424 B2 * | 9/2005 | Philiben et al. | 340/945 |
| 6,989,768 B2 * | 1/2006 | DeMarco et al. | 340/981 |
| 6,989,859 B2 | 1/2006 | Parulski | |
| 7,138,622 B2 * | 11/2006 | Sparkes et al. | 250/230 |
| 2005/0007257 A1 * | 1/2005 | Rast | 340/815.45 |
| 2006/0007013 A1 | 1/2006 | Singer | |
| 2007/0076189 A1 * | 4/2007 | Kumagai et al. | 356/5.01 |

* cited by examiner

*Primary Examiner*—Phung Nguyen
(74) *Attorney, Agent, or Firm*—Muskin & Cusick, LLC; Shawn R. Farmer; Jon H. Muskin (57) ABSTRACT

The following is an aircraft warning light adjustment system. Levels of ambient light and/or reflected light can be detected by detectors and transmitted to a processing unit. A processing unit, based on the received detections, can make automatic decisions concerning whether to turn on or off automatic warning lights located on the aircraft. If the aircraft is flying at night in cloudy conditions, the warning lights can be automatically turned off before the reflections from the clouds can cause pilots to experience night blindness, vertigo, or other problems caused by the reflected light.

23 Claims, 5 Drawing Sheets

APPARATUS AND METHOD FOR PREVENTING NIGHT BLINDNESS AND/OR VERTIGO AMONG PILOTS CAUSED BY THE REFLECTION OF AN AIRCRAFT'S ANTI-COLLISION WARNING LIGHTS FROM CLOUDS OR OTHER LIGHT REFLECTING CONDITIONS INTO THE COCKPIT

FIELD OF THE INVENTION

The field of the invention resides within the art of aircraft anti-collision warning light systems. More specifically, the present inventive concept is directed towards an aircraft's anti-collision warning light apparatus, and a method for its use, which can prevent light from the anti-collision warning lights from being reflected by clouds or other reflecting conditions into the cockpit of the aircraft, and more specifically, into the eyes of the aircraft's pilot and copilot.

BACKGROUND

To reduce the risk of in-flight collisions between aircraft, aircraft are required to be equipped with strobe warning lights, which pulse a high-intensity, short-duration, white light approximately once per second. These bright, pulsing lights make an aircraft more visible to other nearby pilots and are required to be operational and activated pursuant to federal aviation regulations while the aircraft is operating. However, the bright light emitted by these lights can be reflected back into the cockpit by clouds and other light reflecting conditions. For this reason, the pilot is authorized to deactivate these lights when flying in the presence of clouds, haze, fog or other precipitation.

Reflection of these lights into the cockpit are known to have at least two significant adverse effects: the strobe light is of sufficient intensity that it can (1) adversely affect a pilot's night vision, which can take up to thirty minutes to recover; and (2) it can induce vertigo in the pilot. These effects make controlling the aircraft by reference to the flight instruments more difficult and dangerous. Unfortunately, when a pilot is flying at night, he or she often has no way of knowing when the aircraft is about to fly into conditions, which can reflect light from these lights back into the cockpit. Only one reflected flash can be sufficient to significantly impair a pilot's night vision. These lights are typically set on a timer to automatically flash approximately once per second. These facts make it unlikely, therefore, that a pilot would be able to regularly recognize a light reflecting object, such as a cloud, while flying the aircraft, and be able to deactivate the aircraft's anti-collision warning light system before its light could be reflected back into the cockpit.

What is needed is a way to automatically detect clouds, haze, fog and other light reflecting conditions so that an aircraft's anti-collision warning lights can be deactivated immediately, thus preventing their light from being reflected into the cockpit.

SUMMARY OF THE INVENTION

It is an aspect of the current apparatus to provide an aircraft with an automatic adjustment of its warning lights.

The above aspect can be obtained by an apparatus that includes: (a) a reflected light detecting unit to detect a detected amount of reflected light outside of an aircraft; and (b) an adjustment unit to adjust an intensity of or deactivate a warning light located on the aircraft based on the detected amount.

The above aspects can also be obtained by a method for using said warning light apparatus that includes: (a) detecting a detected amount of reflected light outside of an aircraft; and (b) adjust an intensity of, or deactivate a warning light located on the aircraft based on the detected amount.

These, together with other aspects and advantages, which will subsequently become apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the current apparatus, as well as the structure and operation of various embodiments of the current apparatus, will become apparent and more readily appreciated from the following description of the preferred embodiments, taken in conjunction with the accompanying drawings of which.

DETAILED DESCRIPTION OF THE PREFERRED EMBODIMENTS

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Reference will now be made in detail to the presently preferred embodiments of the invention, examples of which are illustrated in the accompanying drawings, wherein like reference numerals refer to like elements throughout.

The present general inventive concept relates to an aircraft anti-collision warning light apparatus which is capable of preventing reflection from these lights into the cockpit of an aircraft caused by clouds, haze, fog or other light reflecting conditions. Generally, this reflection can be prevented by automatically turning off (or turning down the intensity of) the anti-collision warning lights when their light is being reflected.

Figure 1:
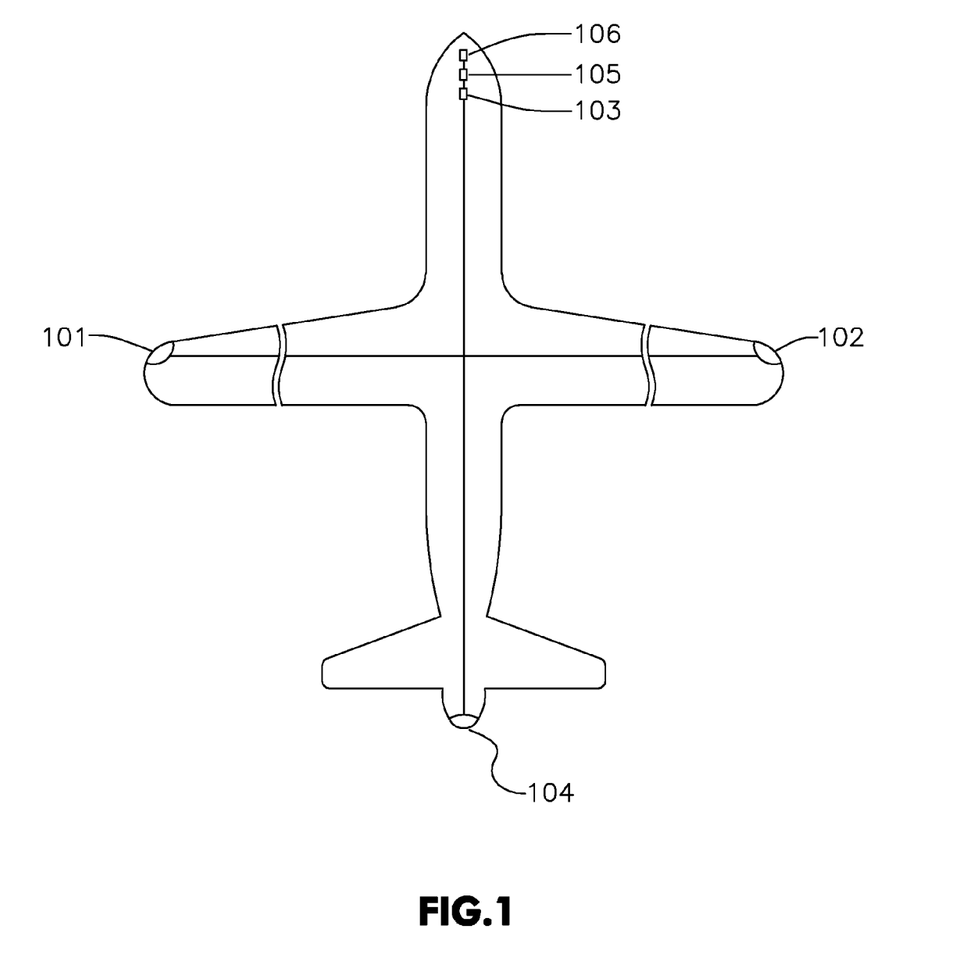
FIG. 1 is a schematic drawing of an aircraft equipped with an anti-reflecting anti-collision warning light apparatus comprising wingtip and tail strobe light assemblies, according to an embodiment.

FIG. 1 is a schematic drawing of an aircraft equipped with an anti-reflecting anti-collision warning light apparatus comprising wingtip and tail strobe light assemblies, according to an embodiment.

An aircraft anti-reflecting anti-collision warning light apparatus can include a tail strobe warning light assembly 104, located at the rear of the aircraft, a left wingtip strobe warning light assembly 101, a right wingtip strobe warning light assembly 102, control circuitry 103, cockpit indicators 105, and cockpit switches 106.

The wingtip strobe warning light assemblies 101 and 102, and the tail strobe warning light assembly 104 are operated by control circuitry 103, which can be centrally located within the aircraft, and/or can be located within the cockpit of the aircraft.

The control circuitry 103 can be connected to cockpit indicators 105, cockpit switches 106, or an apparatus comprising both cockpit indicators and cockpit switches (not pictured). Control circuitry 103 can include computers or other apparatus known in the art, which are capable of retaining an algorithm, receiving and processing data concerning measured light reflection, performing logic functions according to said algorithm, and sending control instructions to said wingtip and tail strobe warning light assemblies 101 and 102 based on the results of said logic functions.

Figure 2:
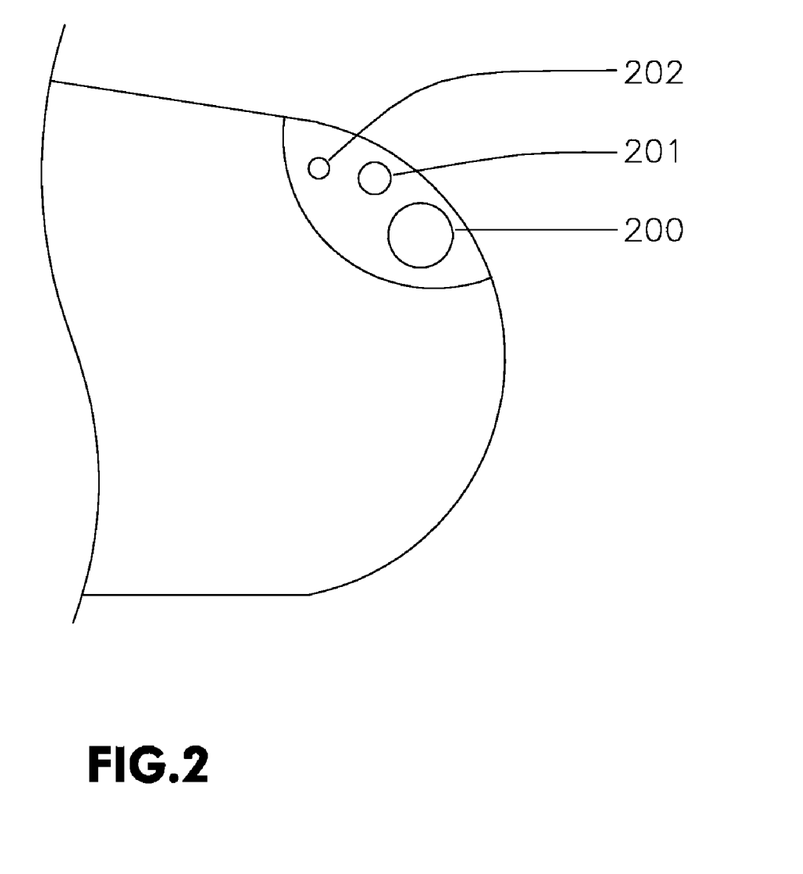
FIG. 2 is a drawing of a wingtip/tail strobe light assembly, containing an anti-reflecting, anti-collision strobe light warning apparatus, according to an embodiment.

FIG. 2 is a drawing of a wingtip/tail strobe light assembly, containing an anti-reflecting, anti-collision strobe light warning apparatus, according to an embodiment.

A wingtip/tail strobe assembly can include a large strobe light 200, a smaller test light source 201, and a light detector 202. The smaller test light source 201 can emit light of sufficiently weak intensity so that any light reflected from this source 201 into a cockpit (not pictured) would be incapable of causing night blindness or vertigo. Alternatively, a large strobe light 200 can be capable of emitting a low-intensity test flash comparable to that emitted by a smaller test light source 201. The light detector 202 can have a sensitivity sufficient to detect light reflected from said smaller test light source 201. The light detector 202 can also be positioned within the wingtip/tail strobe assembly so that it does not detect light directly emitted from said smaller test light source 201, and only detects light from said smaller test light source 201, which has been reflected from a cloud or other light reflecting object. The smaller test light source 201 can also be located adjacent or near the large strobe light 200 and the light detector 202 can be located outside or inside of the cockpit to detect light reflected from the smaller test light source. Alternatively, the smaller test light source 201 can be optional and the large strobe light 200 can be used as the test light source which is detected by the light detector 202 (which can be positioned anywhere, for example near the cockpit, either outside or actually inside the cockpit) to detect reflected light. The large strobe light 200 can flash at full intensity in order to detect for reflected light, or the large strobe light 200 can flash at a weaker intensity for the purposes of detecting for reflected light. An additional alternative would require the smaller test light source 201 to emit a light of unique wavelength, and set the light detector 202 so that it could only detect light of that same unique wavelength. This method could be used to prevent the light detector 202 from measuring light from extraneous sources.

A timing mechanism can optionally be employed which causes a very short delay between the activation of a smaller test light source 201 (or the large strobe light 200) and the activation of a light detector 202. Another alternative for detecting reflected light would be to allow the detector to measure the test flash of the small test light source, but be capable of detecting a smaller amount of reflected light occurring within a short timeframe after the initial test flash. The large strobe light 200 can comprise a standard strobe light currently used for anti-collision warning light purposes of any other suitable warning light known to one of ordinary skill in the art.

The control circuitry 103 can implement an algorithm used in an aircraft anti-reflecting anti-collision warning light system 100 which can automatically detect conditions upon which the warning lights should be turned off or reduced, and automatically effectuate the change.

Figure 3:
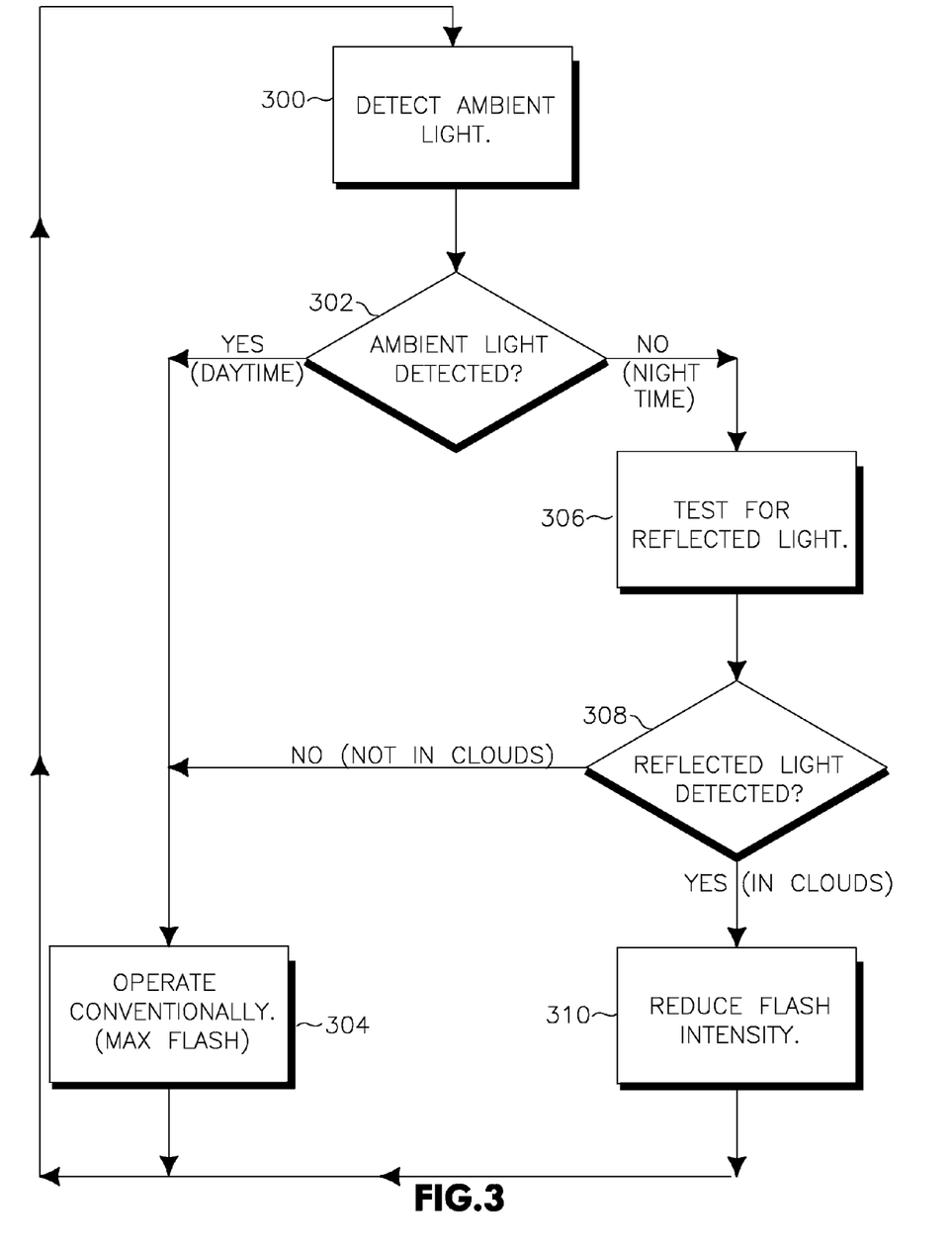
FIG. 3 is a flow chart illustrating a method to automatically adjust an aircraft's warning lights, according to an embodiment.

FIG. 3 is a flow chart illustrating a logic system for use with an anti-reflecting, anti-collision strobe light warning apparatus, which could be included in the system's control circuitry in the form of an algorithm, according to an embodiment.

The method can begin with operation 300, which detects ambient light. For more information on how to detect ambient light, see for example U.S. Pat. No. 6,989,859, which is incorporated by reference in its entirety. If there is sufficient ambient light detected (for example, greater than 1,000 lux), indicating typical daylight conditions outside, there is no danger in having the warning lights flash at their highest strength. If there is little or no ambient light detected (for example less than 1,000 lux), then it would typically be nighttime conditions, which may present the dangers of reflected light described above, namely night blindness and/or vertigo.

From operation 300, the method can proceed to operation 302 which determines whether a predetermined amount of ambient light is detected in operation 300. An ambient light detector can be used to implement this operation.

If the determination in operation 302 determines that there is a requisite (or predetermined) amount of ambient light detected, then it would typically be daylight conditions. The warning lights are typically not deactivated under daylight conditions because the adverse effects of night-blindness and/or vertigo, caused by reflected light, do not occur under these conditions. Thus, the method can proceed to operation 304, wherein the warning lights operate normally (flash according to their own timer). Here the circuitry can adjust the warning lights to operate normally, or if they are already operating normally then no adjustment may be needed. Alternatively, the control circuitry can initiate the warning lights to fire one flash at full intensity, upon which a delay is initiated before the warning lights are fired again so the warning lights do indeed flash. From operation 304, the method can return to operation 300, which continues to detect changes in lighting conditions.

If the determination in operation 302 determines that there is little or no ambient light (e.g., less than 1,000 lux), then this would typically imply that it is nighttime or otherwise dark conditions exist outside. The method can then proceed to operation 306 which tests for reflected light. For more information regarding the measurement of reflected light, see for example U.S. Pat. No. 7,138,622, which is incorporated here by reference in its entirety. This test can be performed by using a light source (as described herein) and a light detector (as described herein) which is activated instantly after the light source is activated and/or can be positioned so as to detect only reflected light. If the light detector detects more light than would typically be detected or if there were no reflection effect, then the excess light would be correlated to the reflection effect.

From operation 306, the method can proceed to operation 308, which determines whether a requisite amount of reflected light is detected. The requisite amount of reflected light is the amount of reflected light which would cause the pilots discomfort. This can be predetermined (either by trial and error) and optionally adjusted by the pilots themselves. If the requisite amount of reflected light is not detected, then there typically would not be enough of the reflection effect existing in the current flying conditions (e.g., cloud surroundings, etc.) to present a hazard to the aircraft. This condition represents a typical operation of the aircraft in nighttime or dark conditions, where clouds, haze, fog or other light reflecting conditions are not present. Thus, the method can then proceed to operation 304, wherein the warning lights operate normally. Here the circuitry can adjust the warning lights to operate normally, or if they are already operating normally then no adjustment may be needed. From operation 304, the method can return to operation 300, which continues to detect changes in lighting conditions.

If the determination in operation 308 determines that there is at least the requisite amount of reflected light detected, then there currently would be a reflection effect that could present a danger to the pilot and the aircraft. This condition represents nighttime or dark conditions, where clouds, haze, fog and other light reflecting conditions are present. Thus, the method can proceed to operation 310, which would either deactivate (turn off) the warning lights, or alternatively reduce the flash intensity of the warning lights so the lights are not as bright/intense and present less of a danger to the pilots (e.g., flash the lights at 50% of full intensity). The warning lights can have their own circuitry with their own timer wherein the intensity can be adjusted by the control circuitry. Alternatively, the control circuitry can instruct the warning lights to flash at a reduced intensity, upon which a delay would be initiated before the method can fire the warning lights again so that the lights do indeed flash. From operation 308, the method can return to operation 300, which continues detection.

Figure 4:
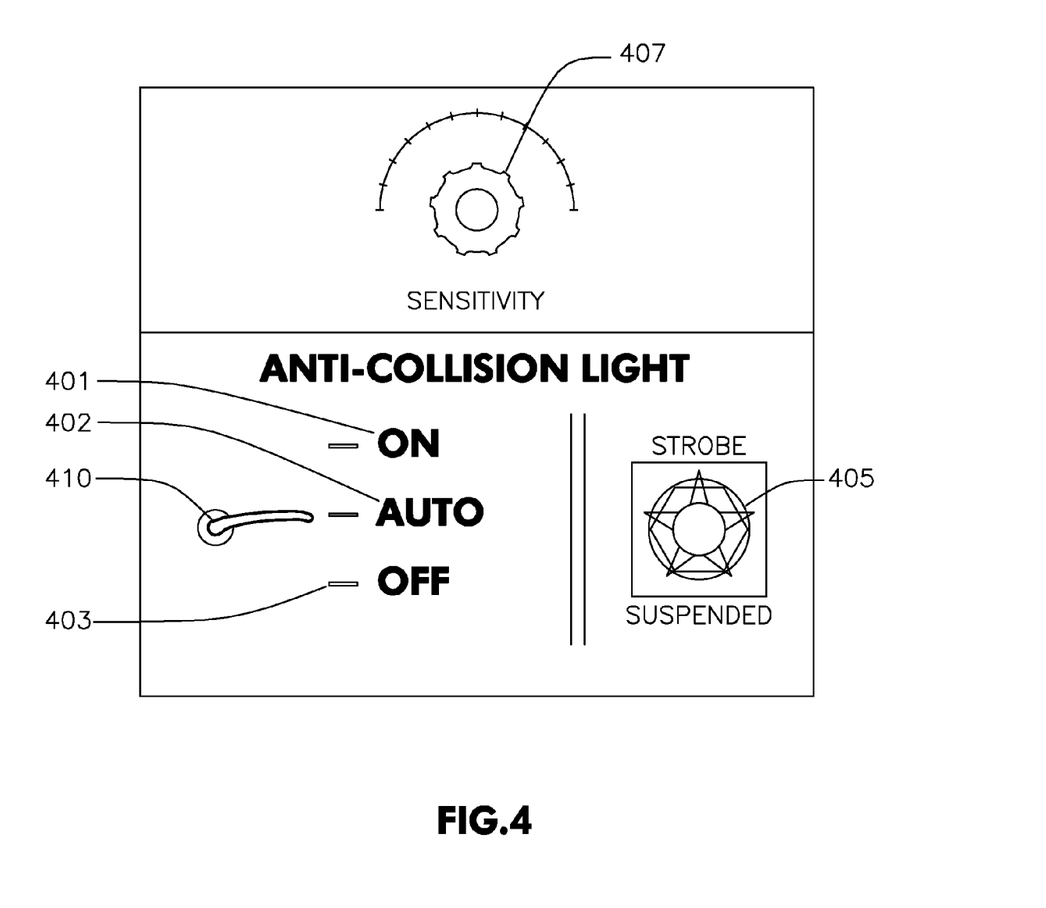
FIG. 4 is a drawing of a cockpit switch and indicator assembly for use with an anti-reflecting, anti-collision strobe light warning apparatus, according to an embodiment.

FIG. 4 is a drawing of a cockpit switch and indicator assembly for use with an anti-reflecting, anti-collision strobe light warning apparatus, according to an embodiment.

An anti-reflecting, anti-collision strobe light warning system 100 can be activated, deactivated, or overridden by a three-position toggle switch apparatus 400 located within an aircraft cockpit (not pictured). The three-position toggle switch 410 can be set in position 401 to override an aircraft anti-collision light apparatus 100, causing one or more large, anti-collision strobe warning lights 200 to remain on even under light reflecting conditions.

The switch 410 can be set in position 402 to activate an automatic mode wherein the aircraft anti-collision light apparatus 100 can automatically control whether the warning lights are on (and/or their intensity). The switch 410 can also be set in position 403 causing one or more large, anti-collision strobe warning lights 200 to remain off even under non-light reflecting conditions. This three-position toggle switch apparatus 400 can also include an indicator (or status) light 405, which when activated can indicate that the operation of an aircraft's large anti-collision strobe lights 200 has been suspended (or can indicate their intensity level). An optional reflected light indicator may also output a detected amount of reflected amount (using either an analog or a digital display).

The cockpit switch and indicator assembly in FIG. 4 can also comprise a knob 407, or other adjusting device which can be used to manually increase or decrease the requisite amount of reflected light used in operation 308 in order to determine whether or not to turn off (or reduce the intensity of) the warning lights. This feature would allow a pilot to determine the intensity of reflected light required to either deactivate or decrease the intensity of the aircraft strobe warning lights 200. Thus, for example, if the switch 410 is set to the automatic position 402 and yet reflected light is still a problem for the pilots, then one of the pilots can reduce the requisite amount of reflected light until the reflection from the warning lights no longer distracts them (e.g., the warning lights have been turned off or their intensity has been reduced).

Figure 5:
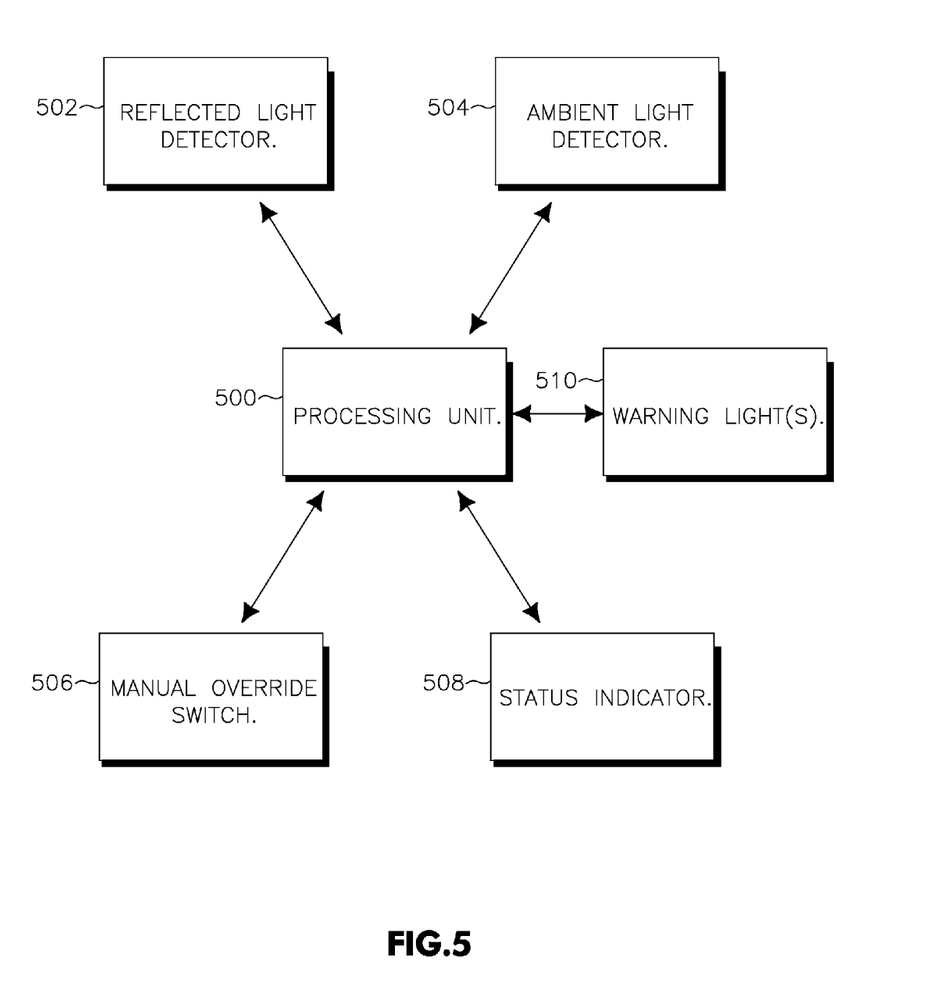
FIG. 5 is a block diagram illustrating components that can be used to implement an automatic warning light adjustment system, according to an embodiment.

FIG. 5 is a block diagram illustrating components that can be used to implement an automatic warning light adjustment system, according to an embodiment.

A processing unit 500 can be a digital computer which can control the system and implement a method to automatically adjust warning lights, such as the method illustrated in FIG. 3. Of course, multiple processing units can be used in the implementation as well. A reflected light detector 502 is connected to the processing unit 500 and is used to detect an amount of reflected light outside of the aircraft. An ambient light detector 504 is connected to the processing unit 500 and is used to detect a measurement of ambient light outside of the aircraft. The processing unit 500 can be used to receive the input from the ambient light detector 504 in order to determine if it is sufficiently light outside that the warning lights can remain on without need to test reflected light. The processing unit 500 can also be used to receive the input from the reflected light detector 502 in order to determine if there is enough reflected light to warrant shutting off (or reducing intensity of) the warning lights 510.

The processing unit 500 can be directly (or indirectly) connected to the warning lights 510 so that the processing unit 500 can turn the warning lights on or off, or adjust their intensity or speed of flashing. The processing unit 500 can also drive a status indicator 508, which would typically be in the cockpit (although it can appear anywhere on the aircraft), which indicates whether the warning lights are on or off, and any other characteristic about the warning lights (e.g., intensity, speed of flashing, etc.) The status indicator 508 can also indicate the measurement of ambient light measured from the ambient light detector 504. The status indicator 508 can also indicate the amount of reflected light detected from the reflected light detector 502.

The processing unit 500 can also be connected to a manual override switch 506 which would typically be located in the cockpit and can be used by the pilots to manually control (e.g., turn on, off, adjust intensity, etc.) the warning lights. The manual override switch 506 can override any automatic determinations made by the system. For example, if the system turns the warning lights on even though this action results in irritation of the pilots, the pilots can simply use the manual override switch 506 to manually turn the warning lights off. This may occur if the detectors malfunction or perhaps a pilot may be unusually sensitive to the warning lights being turned on even though there wasn't the requisite amount of reflected light sufficient for the system to automatically turn off the warning lights. Any of the features in FIG. 4 can also be connected to and controlled by the processing unit 500, including the adjusting device 407.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. An anti-collision warning light adjustment apparatus, the apparatus comprising:
    a reflected light detecting unit to detect a detected amount of reflected light, but not direct light, originating from a first light source attached outside of an aircraft; and an adjustment unit to adjust an intensity of a warning light located on the aircraft based on the detected amount, wherein if the detected amount is higher than a predetermined threshold then the intensity of the warning light is set to a low level, and if the detected amount is lower than the predetermined threshold then the intensity of the warning light is set to a high level.

2. The apparatus as recited in claim 1, wherein the reflected light detecting unit comprises the first light source and a first light detector, and the first light detector detects an intensity of light received from the first light source.

3. The apparatus as recited in claim 2, wherein the first light source emits light of a particular wavelength distinct from any other external lights on the aircraft and the first light detector detects light from the particular wavelength.

4. The apparatus as recited in claim 3, further comprising cockpit switches capable of activating and deactivating the warning light which override the adjustment unit.

5. The apparatus as recited in claim 3, further comprising a status indicator located in a cockpit of the aircraft indicating a status of the warning light and an indicator of the detected amount of reflected light.

6. The apparatus as recited in claim 2, further comprising cockpit switches capable of activating and deactivating the warning light which override the adjustment unit.

7. The apparatus as recited in claim 2, further comprising a status indicator located in a cockpit of the aircraft indicating a status of the warning light and an indicator of the detected amount of reflected light.

8. The apparatus as recited in claim 2, wherein the first detector is located inside of a cockpit of the aircraft.

9. The apparatus as recited in claim 2, wherein the first detector is located externally on the aircraft.

10. The apparatus as recited in claim 1, further comprising cockpit switches capable of activating and deactivating the warning light which override the adjustment unit.

11. The apparatus as recited in claim 1, further comprising a status indicator located in a cockpit of the aircraft indicating a status of the warning light and an indicator of the detected amount of reflected light.

12. An anti-collision warning light adjustment apparatus, the apparatus comprising:
   a reflected light detecting unit to detect a detected amount of reflected light, but not direct light, originating from a first light source attached outside of an aircraft;
   an adjustment unit to adjust an intensity of a warning light located on the aircraft based on the detected amount; and
   an ambient light detecting unit to detect a measurement of ambient light outside of an aircraft,
   wherein if the measurement of ambient light is greater than a preset quantity, then an intensity of the warning light is set to a high level and the reflected light detecting unit is not activated, and if the measurement of ambient light is less than the preset quantity, then the reflected light detecting unit is activated.

13. An anti-collision warning light adjustment apparatus, the apparatus comprising:
   a reflected light detecting unit to detect a detected amount of reflected light, but not direct light, originating from a first light source attached outside of an aircraft;
   an adjustment unit to adjust an intensity of a warning light located on the aircraft based on the detected amount; and
   cockpit switches capable of activating and deactivating the warning light which override the adjustment unit.

14. A method to automatically adjust warning lights on an aircraft, the method comprising:
   providing a first light source attached to outside of the aircraft;
   detecting a detected amount of reflected light but not direct light, from the first light source; and
   adjusting an intensity of a warning light located on the aircraft based on the detected amount,
   wherein if the detected amount is higher than a predetermined threshold then an intensity of the warning light is set to a low level or turned off, and if the detected amount is lower than the predetermined threshold then the intensity of the warning light is set to a high level.

15. The method as recited in claim 14, further comprising, allowing adjustment, by a pilot of the aircraft, of the predetermined threshold.

16. A method to automatically adjust warning lights on an aircraft, the method comprising:
   providing a first light source attached to outside of the aircraft;
   detecting a detected amount of reflected light but not direct light, from the first light source;
   adjusting an intensity of a warning light located on the aircraft based on the detected amount;
   detecting a measurement of ambient light outside of an aircraft,
   if the measurement of ambient light is greater than a preset quantity, then the intensity of the warning light is set to a high level and is not subject to the adjusting, otherwise continuing the adjusting the intensity of the warning light.

17. The method as recited in claim 16, wherein if the detected amount is higher than a predetermined threshold then an intensity of the warning light is set to a low level or turned off, and if the detected amount is lower than the predetermined threshold then the intensity of the warning light is set to a high level.

18. An anti-collision warning light adjustment apparatus, the apparatus comprising:
   a reflected light detecting unit to detect a detected amount of reflected light originating from outside of an aircraft; and
   an adjustment unit to adjust an intensity of a warning light located on the aircraft based on the detected amount,
   wherein if the detected amount is higher than a predetermined threshold then the intensity of the warning light is set to a low level, and if the detected amount is lower than the predetermined threshold then the intensity of the warning light is set to a high level.

19. The apparatus as recited in claim 18,
   wherein the reflected light detecting unit comprises a first light source located outside of the aircraft and a first light detector, and the first light detector detects an intensity of light received from the first light source.

20. The apparatus as recited in claim 19,
   wherein the first light source emits light of a particular wavelength distinct from any other external lights on the aircraft and the first light detector detects light from the particular wavelength.

21. An anti-collision warning light adjustment apparatus, the apparatus comprising:
   a reflected light detecting unit to detect a detected amount of reflected light originating from outside of an aircraft;
   an adjustment unit to adjust an intensity of a warning light located on the aircraft based on the detected amount; and
   an ambient light detecting unit to detect a measurement of ambient light outside of an aircraft,
   wherein if the measurement of ambient light is greater than a preset quantity, then an intensity of the warning light is set to a high level and the reflected light detecting unit is not activated, and if the measurement of ambient light is less than the preset quantity, then the reflected light detecting unit is activated.

22. A method to automatically adjust warning lights on an aircraft, the method comprising:
   detecting a detected amount of reflected light outside of an aircraft; and
   adjusting an intensity of a warning light located on the aircraft based on the detected amount,
   wherein if the detected amount is higher than a predetermined threshold then an intensity of the warning light is set to a low level or turned off, and if the detected amount is lower than the predetermined threshold then the intensity of the warning light is set to a high level.

23. A method to automatically adjust warning lights on an aircraft, the method comprising:
   detecting a detected amount of reflected light outside of an aircraft; and
   adjusting an intensity of a warning light located on the aircraft based on the detected amount,
   detecting a measurement of ambient light outside of an aircraft,
   if the measurement of ambient light is greater than a preset quantity, then the intensity of the warning light are set to a high level, otherwise performing:
   detecting a detected amount of reflected light outside of an aircraft; and adjusting the intensity of a warning light located on the aircraft based on the detected amount.

* * * * *